(12) United States Patent
Xu et al.

(10) Patent No.: US 6,788,852 B1
(45) Date of Patent: Sep. 7, 2004

(54) DOUBLE-TUBE FIBER COUPLER PACKAGE

(75) Inventors: Senlu Xu, Fremont, CA (US); Steve Wang, San Jose, CA (US); Johnny Zhong, Hayward, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/135,205

(22) Filed: Apr. 30, 2002

Related U.S. Application Data
(60) Provisional application No. 60/357,707, filed on Feb. 15, 2002.

(51) Int. Cl.[7] .............................................. G02B 6/255
(52) U.S. Cl. .......................................... 385/43; 385/51
(58) Field of Search ............................... 385/15, 39, 42, 385/43, 50, 51, 55, 56, 95, 96, 99, 137

(56) References Cited

U.S. PATENT DOCUMENTS

| | | | | |
|---|---|---|---|---|
| 5,694,509 A | * | 12/1997 | Uemura et al. ................ | 385/99 |
| 5,805,752 A | * | 9/1998 | Campbell et al. .............. | 385/51 |
| 6,167,176 A | * | 12/2000 | Belt ............................. | 385/51 |
| 6,215,944 B1 | | 4/2001 | Ota et al. .................... | 385/137 |

* cited by examiner

*Primary Examiner*—John D. Lee
*Assistant Examiner*—Sarah U Song
(74) *Attorney, Agent, or Firm*—Workman Nydegger

(57) ABSTRACT

Coupler packages for providing protection against the elements for fused fiber couplings. The coupler package has an inner and outer cylinder for providing additional buffering against vibration, temperature expansion, corrosion, and water penetration. The double tube structure increases the penetration length for water, while the seals decrease the cross section for water penetration.

30 Claims, 7 Drawing Sheets

DOUBLE-TUBE FIBER COUPLER PACKAGE

RELATED APPLICATION

This application claims the benefit of U.S. Provisional Patent Application Ser. No. 60/357,707, entitled "Double-Tube Fiber Coupler Package," filed Feb. 15, 2002, which is incorporated herein by reference.

BACKGROUND OF THE INVENTION

1. The Field of the Invention

The present invention relates to systems, apparatus and methods for a fiber optic package for a fiber coupler. More particularly, the present invention relates to a packaging apparatus for a fiber coupler having a configuration adapted to provide the water and anti-vibration protection required by wavelength division multiplexing couplers.

2. Background and Relevant Art

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on copper conductor.

Many conventional electrical networks are being upgraded to optical networks to take advantage of the increased speed and efficiency. One of the many required components of an optical network is a fiber coupler. In a fiber coupler, optic fibers are coupled allowing for a variety of functionality required by optical networks. Fiber couplers perform the function of division and distribution of power in a fiber circuit. This division may be independent of wavelength and polarization, as in the case of a star coupler in distributive networks. On the other hand, it may be designed to couple a specific band of wavelengths from one fiber to another, as in a pump multiplexer in an EDFA circuit. One widely used method of forming fused couplers is accomplished by twisting two monomode fibers together, heating in a short region until the fibers fuse, and pulling to taper them down into a coupled structure.

Fiber coupler packaging technologies have developed to provide the additional strength and protection needed to maintain the integrity of the fused fiber couplings. FIG. 1 illustrates a prior art coupler package 1. Coupler package 1 comprises a cylinder 10, first and second seals 20a,b, and anti-vibration rings 30a,b. The coupler package 1 is adapted to provide protection to fused portion 6 of first fiber 2 and second fiber 4.

The cylinder 10 comprises a outer cylinder 12 and an inner sleeve 14. The outer cylinder is made of stainless steel to provide the impact protection, while the inner sleeve is comprised of a non-metallic material to provide temperature and corrosion buffering. Anti-vibration rings 30a,b are comprised of rubber to provide the vibration protection to coupler package 1.

First and second seals 20a,b are adapted to prevent moisture penetration to the interior of the cylinder 10. The first seal 20a is comprised of a first washer 22a, an epoxy element 24a, a second washer 26a, and an epoxy end member 28a. The first and second washers 22a, 26a are comprised of rubber and provide protection against vibration and moisture penetration by forming a seal with the outer cylinder 12. Epoxy element 24a and epoxy end member 28a, form an adhesive coupling with washers 22a, 26a and outer cylinder 12 providing additional moisture penetration protection to the interior of cylinder 10.

The second seal 20b is comprised of a first washer 22b, an epoxy element 24b, a second washer 26b, and an epoxy end member 28b. The first and second washers 22b, 26b are comprised of rubber and provide protection against vibration and moisture penetration by forming a seal with the outer cylinder 12. Epoxy element 24b and epoxy end member 28b, form an adhesive coupling with washers 22b, 26b and outer cylinder 12 providing additional moisture penetration protection to the interior of cylinder 10.

While the coupler package illustrated in FIG. 1 provides some protection against moisture penetration and vibration, the amount of protection is insufficient for some types of couplers and/or in certain conditions. For example, wavelength division multiplexing (WDM) couplers require a higher degree of temperature and water penetration protection than other fiber couplers due to the coupler's susceptibility to wavelength shifts. The Telecordia reliability test, particularly the 85 degree Celsius and the 85% humidity test, illustrate the shortcomings of traditional fiber coupler packaging configurations in providing the degree of protection needed for substantial durations under severe conditions.

One approach to increase the temperature and humidity strength of fiber couplers has been to utilize a metal sealing configuration. Metal sealing is accomplished by removing the fiber coating of an optic fiber. Evaporated or plated gold is coupled to the fiber. The fiber is then gold soldered to a gold plated module or tube. Additional anti-vibration measures are also provided to the tube or module. The metal sealing provides the necessary water penetration protection while the anti-vibration measures provide the needed vibration protection. While the metal sealing configuration provides some of the needed protection, the manufacturing and other requirements of such couplers increase the size and cost of the coupler and coupler packaging. Additionally, the soldering of the fibers and the removal of the fiber coating can increase the damage and stress to the fiber, reducing the overall strength of the fiber.

In view of the above, it is apparent that there is a need for a new and improved coupler package apparatus. It is desirable that the apparatus provide additional moisture and anti-vibration protection for fused fiber coupling.

BRIEF SUMMARY OF THE INVENTION

These and other problems are overcome by the present invention which is directed to a coupler package providing additional moisture and anti-vibration protection. The coupler package utilizes an inner assembly and an outer assembly. The inner and outer assembly preferably comprise first and second cylinders. The cylinders form an inner chamber and an outer chamber. The inner chamber encloses fused optical fibers while the outer chamber encloses the inner cylinder. The ends of the cylinders are sealed thus providing moisture protection to the sealed fibers. The dual assembly configuration provides additional moisture and anti-vibration protection to the fused fibers of the fiber coupler. The double tube structure increases the penetration length for water and the seals decrease the cross section for water penetration.

In one embodiment, the cylinders are formed from INVAR (a metal alloy that exhibits a nearly zero coefficient of thermal expansion), providing additional temperature and impact protection to the fibers. While maintaining the needed protection, the double tube configuration allows the package to remain small and inexpensive to manufacture. In yet another embodiment, the present invention does not require a metal solder, thus maintaining the integrity of the fused fibers. In another embodiment of the present invention, anti-vibration rings are provided in both the inner and outer assemblies thus providing additional anti-vibration protection.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Fiber coupler packaging technologies have developed to provide the additional strength and protection needed to maintain the integrity of the fused fiber couplings. Coupler packages provide protection against elements that can affect the integrity of fused fiber couplings. In particular, coupler packages provide moisture, anti-vibration, impact, corrosion, and thermal expansion protection.

The present invention relates to invention relates to a packaging apparatus for a fiber coupler having a configuration adapted to provide the water and anti-vibration protection required by WDM couplers. A first and second tube are provided for providing additional protection to the fused fiber coupling. The double tube structure increases the penetration length for water with the seals decreases the cross section for water penetration.

In the preferred embodiment, first and second cylinders are provided. The first cylinder is enclosed by the second cylinder. The first cylinder encloses the fused optical fibers. The end of the cylinders are sealed and provided with anti-vibration protection, thus providing the moisture and anti-vibration protection needed to maintain the integrity of the fused fiber coupling. Additionally, in the preferred embodiment the cylinders are, at least in part, formed from INVAR (or other similar metal alloy with a nearly zero coefficient of thermal expansion), thus providing additional impact and thermal expansion protection to the fused fiber coupling.

Figure 1:
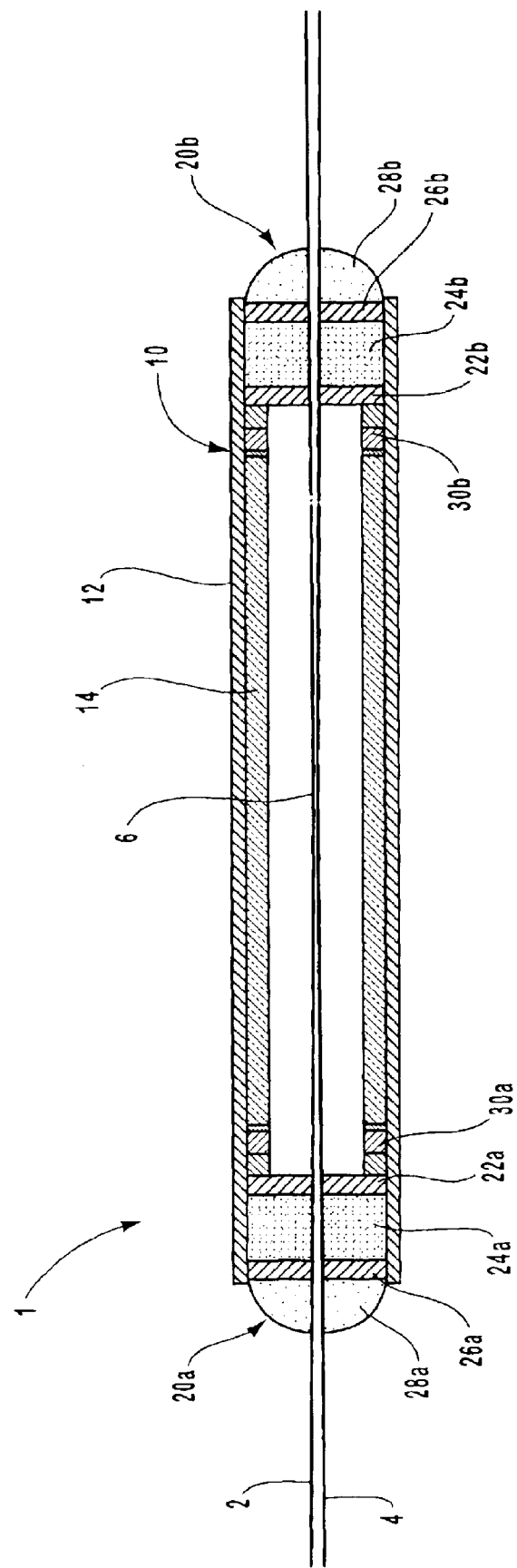
FIG. 1 illustrates a cross sectional side view of an exemplary coupler package of the prior art having a single cylinder.
Figure 2:
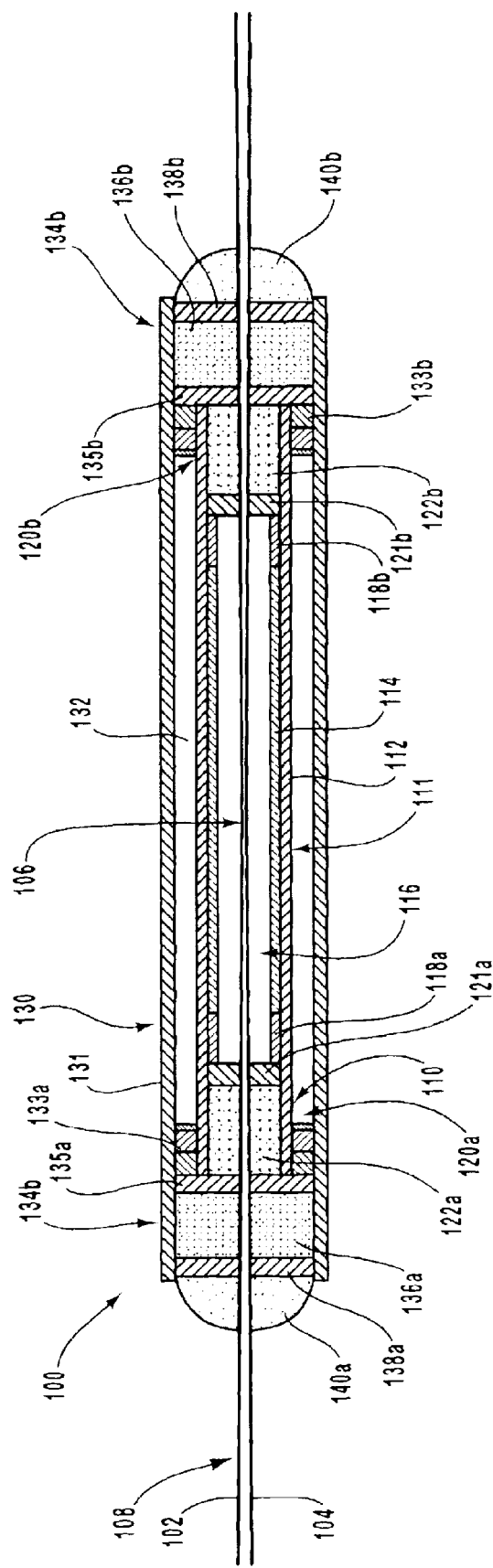
FIG. 2 illustrates a cross sectional side view of an exemplary coupler package illustrating the inner and outer assembly.

FIG. 2 illustrates a cross sectional side view of an exemplary coupler package 100 illustrating the inner assembly 110 and outer assembly 130. There is also shown a first fiber 102 and a second fiber 104. The coupler package provides protection for the fused portion of fibers 106. As will be appreciated by those skilled in the art, the number of fibers that are fused in a fused fiber coupling are not limited to two fibers. Any number or configuration of fused fiber coupling can be utilized with the coupler package of the present invention.

The coupler package comprises an inner assembly 110 and an outer assembly 130. The inner assembly comprises an inner wall 111, first and second anti-vibration mechanisms 118a,b, and first and second inner assembly seals 120a,b. The inner assembly 110 forms an inner chamber enclosing the fused portion of fibers 106 providing a barrier to the fused portion of fibers 106 from water, thus preventing moisture from interacting with the optical fibers. The inner assembly 110 also protects against thermal expansion and other potentially damaging elements.

The inner wall 111 of inner assembly 110 includes outer cylinder 112 and inner sleeve 114. Outer cylinder 112 and inner sleeve 114 are formed from different materials to provide additional buffering qualities not provided by a cylinder comprised of a single material. In a preferred embodiment, the outer cylinder 112 is formed from INVAR or other similar metal alloy. INVAR is preferred due to its limited thermal expansion qualities as well as its ability to resist impact. The inner sleeve 114 is formed from quartz. The quartz material of the inner sleeve 114 provides mechanical and moisture protection to the fused portion of fibers 106.

In the illustrated embodiment, the inner sleeve 114 is not coterminous with the outer cylinder 112. This allows first and second anti-vibration mechanisms 118a,b, as well as first and second inner seal assemblies 120a,b to be contained internal to outer cylinder 112 while being positioned laterally to inner sleeve 114. In the illustrated embodiment, anti-vibration mechanisms 118a,b are rubber rings positioned adjacent to inner sleeve 114. The anti-vibration mechanisms 118a,b contact portions of inner assembly 110 that are susceptible to vibration. The anti-vibration mechanisms 118a,b absorb vibration energy by elastic deformation, limiting the amount of vibration energy that will be transferred to fused portion of fibers 106.

First and second inner assembly seals 120a,b provide moisture and corrosion protection to the fused portion of fibers 106. First inner assembly seal 120a includes a washer 121a and an epoxy element 122a. Second inner assembly seal 120b similarly includes a washer 121b and an epoxy element 122b. Washers 121a,b form a seal with anti-vibration mechanisms 118a,b and outer cylinder 112. The addition of epoxy elements 122a,b further reinforces the seal. Fibers 102, 104 pass through epoxy elements 122a,b such that the epoxy elements form a seal around fibers 102, 104.

Outer assembly 130 forms an outer chamber 132 enclosing the inner sealed chamber. The outer sealed chamber 132 is thermally insulated from the exterior of the coupler package. The outer sealed chamber 132 can also provide moisture, impact, and corrosion protection. By providing another layer of protection to the fused portion of the fibers 106, the outer assembly 130 is helpful in maintaining the integrity of the fused fiber coupling. The outer assembly 130 comprises an outer wall 131, first and second anti-vibration mechanisms 133a, 133b, and first and second outer assembly seals 134a,b.

The outer wall 131 is preferably formed from the metal alloy INVAR. INVAR is preferred due to its limited thermal expansion qualities as well as its ability to resist impact. However, the outer wall 131 can be formed from any of a variety of materials without departing from the scope or spirit of the present invention. For example, the outer wall 131 can be formed from stainless steel or other materials having a limited thermal expansion. The limited thermal expansion provided by the outer wall 131 coupled with the insulation provided by outer chamber 132 provides additional thermal protection to the fused portion of the fibers 106.

In the illustrated embodiment of the present invention, the first and second anti-vibration mechanisms 133a,b are rubber rings coupled between the outer wall 131 of the outer assembly 130 and the outer cylinder 112 of the inner assembly 110. By being coupled between the outer wall 131 and the outer cylinder 112, the anti-vibration mechanisms 133a,b absorb vibration energy that can be transferred to the inner assembly 110, thus providing additional anti-vibration protection to the fused portion of fibers 108.

The first and second outer assembly seals 134a,b seal the first and second ends of the tube formed by the outer wall 131. The first and second outer assembly seals 134a,b form a barrier against moisture thus providing, not only moisture protection, but also corrosion protection, impact protection, and some thermal and anti-vibration protection. The first outer assembly seal 134a includes a first washer 135a, an epoxy element 136a, a second washer 138a, and an epoxy end member 140a. The second outer assembly seal 134b includes a first washer 135b, an epoxy element 136b, a second washer 138b, and an epoxy end member 140b.

The first washers 135a,b form a seal with outer wall 131, the first and second anti-vibration mechanisms 133a,b and the inner assembly 110. The epoxy elements 136a,b provide additional strength and adhesion to the seal formed by washers 135a,b. Additionally, the different properties of the rubber and epoxy provide different advantages that when utilized together provide a more reliable seal than if either material was used alone. Washers 138a,b provide a seal between outer wall 131 and epoxy elements 136a,b. Finally, epoxy end members 140a,b form a final seal between washers 138a,b and outer wall 131. The first and second fibers 102, 104 pass through first and second outer assembly seals 134a,b such that a seal is formed around the fibers, thus further providing a seal against the elements.

Figure 3:
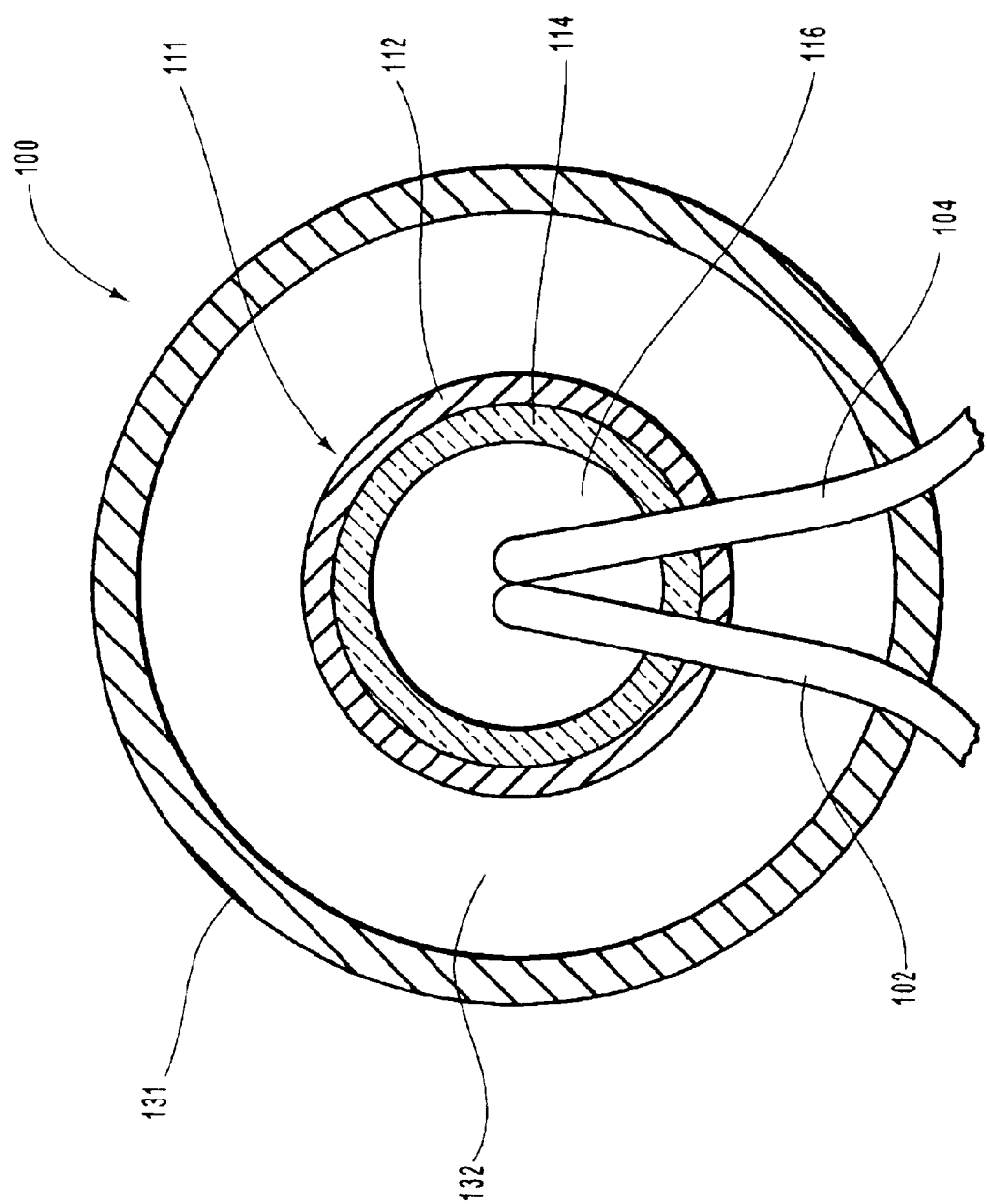
FIG. 3 is a cross sectional end view illustrating the inner and outer assemblies and the manner in which the fibers pass through the coupler package.

FIG. 3 is a cross sectional end view of an exemplary embodiment of coupler package 100 illustrating the inner and outer assemblies 110, 130 and the manner in which the fibers 102, 104 pass through the coupler package 100. The inner wall 111 forms an inner chamber 116. The first and second fibers 102, 104 pass through the inner chamber 116 in a length-wise fashion. The illustrated embodiment, shows the inner sleeve 114 and outer cylinder of the inner wall 111. The outer wall 131 of outer assembly 130 forms an outer chamber 132. The outer chamber 132 and outer wall 131 provide an additional layer of protection to the fibers 102, 104.

Figure 4:
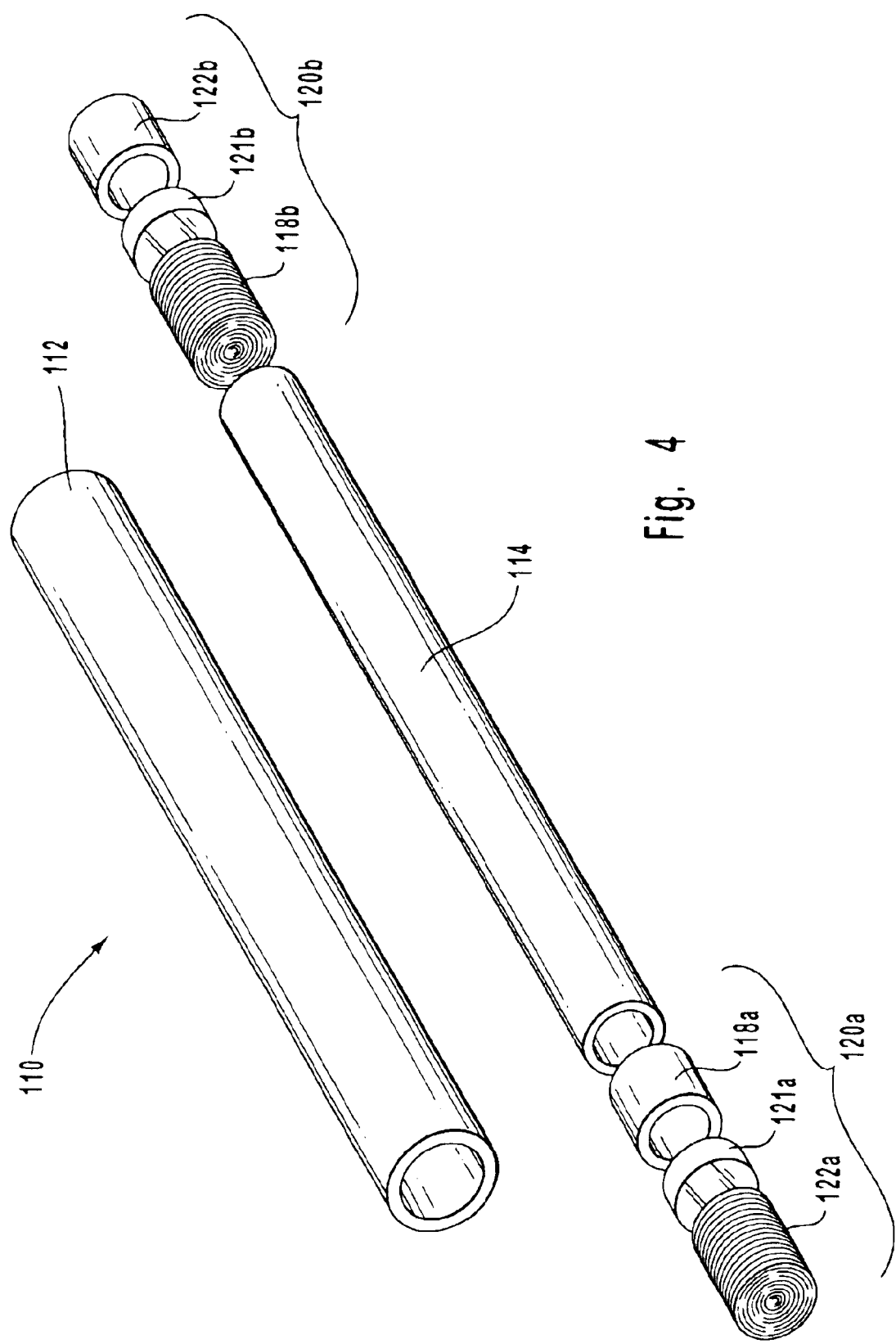
FIG. 4 is a schematic view illustrating the components of the inner assembly the juxtaposition of the first and second inner assembly seals.

FIG. 4 is a schematic view illustrating the components of the inner assembly 110 the juxtaposition of the first and second inner assembly seals 120a,b. The outer cylinder 112 comprises the exterior surface of the inner assembly 110. In the preferred embodiment, the outer cylinder 112 is formed from the metal alloy INVAR, as has been noted above. INVAR is preferred due to its limited thermal expansion qualities as well as its ability to resist impact. However, the outer cylinder 112 can be formed from a variety of materials without departing from the scope or spirit of the present invention. For example, the outer cylinder can be formed from stainless steel or other materials having a limited thermal expansion. The inner sleeve 114 is formed from quartz.

In the illustrated embodiment, the inner sleeve 114 is not coterminous with the outer cylinder 112. The first and second anti-vibration mechanisms 118a,b, and the first and second inner seal assemblies 120a,b are contained internal to outer cylinder 112. The anti-vibration mechanisms 118a,b absorb vibration energy by elastic deformation. Thus, limiting the amount of vibration energy that will be transferred to fused portion of fibers 106.

The washers 121a,b and epoxy elements 122a,b of the first and second inner assembly seals 120a,b provide impact protection, corrosion protection, moisture protection, thermal protection, and/or vibration protection to the fused portion of fibers 106. Washers 121a,b form a flexible seal with anti-vibration mechanisms 118a,b and outer cylinder 112. The addition of epoxy elements 122a,b provides adhesion and rigidity to the seal. Fibers 102, 104 pass through epoxy elements 122a,b such that the epoxy elements form a seal around fibers 102, 104.

Figure 5:
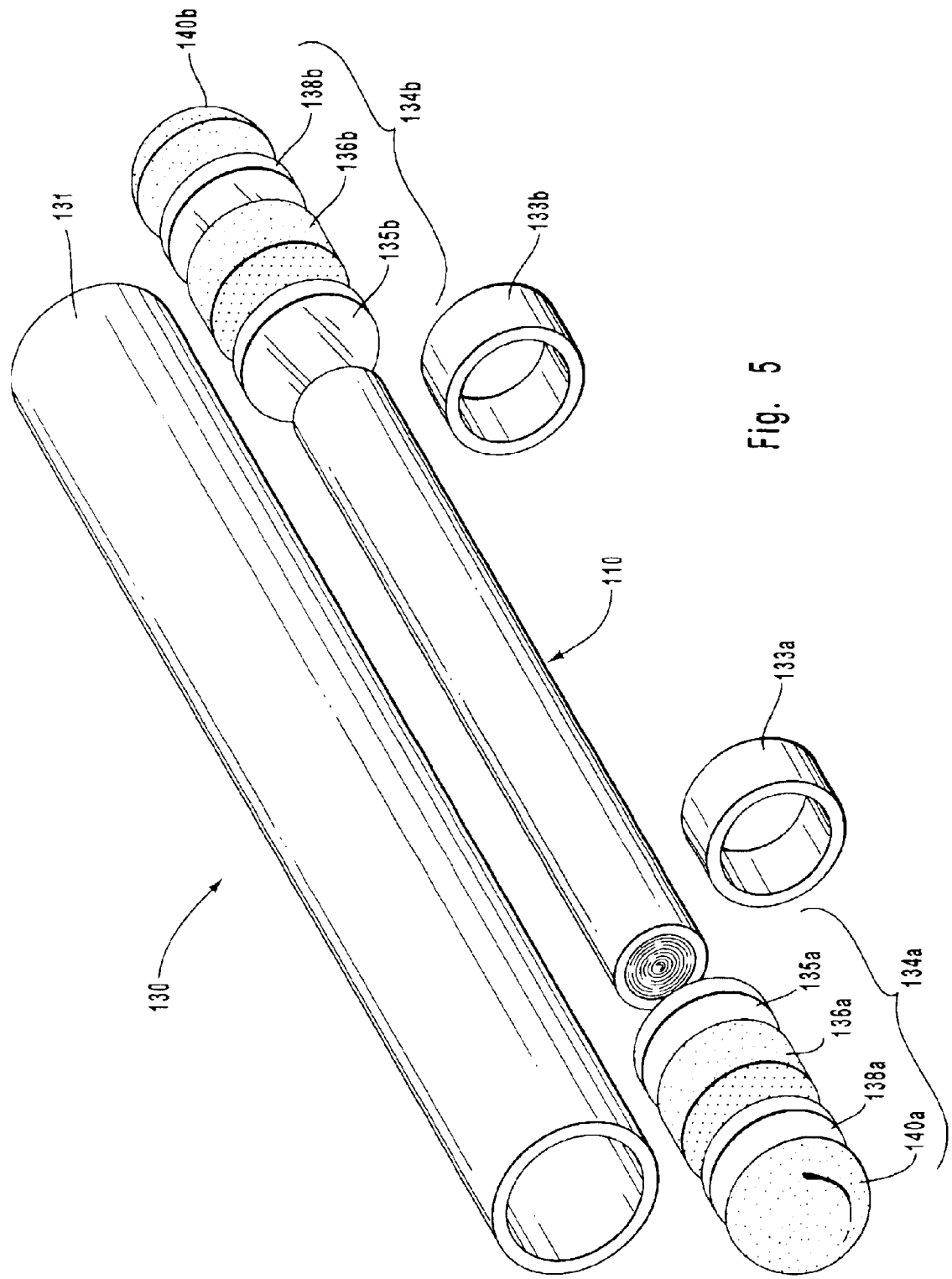
FIG. 5 is a schematic view illustrating the inner assembly and the components of the outer assembly including the first and second outer assembly seals.

FIG. 5 is a schematic view illustrating the inner assembly 110 and the components of the outer assembly 130 including the first and second outer assembly seals 134a,b. The outer wall 131 forms the outer portion of the coupler package 100. The inner assembly 110, the first and second outer assembly seals 134a,b, and the anti-vibration mechanisms 133a,b lie internal to the outer wall 131. In a preferred embodiment, the outer wall 131 is formed from the metal alloy INVAR, thus providing the limited thermal expansion and impact resistance to protect the fused portion of the fibers 106 (see FIG. 2).

The anti-vibration mechanisms 133a,b, in the illustrated embodiment are rings that are positioned between the inner portion of outer wall 131 and the inner assembly 110. The anti-vibration mechanisms 133a,b prevent the inner assembly from moving while also providing protection from vibration. The first and second outer assembly seals 134a,b are positioned such that they sandwich inner assembly 110 while sealing the ends of the tube formed by outer wall 131. The schematic view illustrates how the layers 135a,b; 136a,b; 138a,b; and 140a,b are positioned at the ends of inner assembly 110.

Figure 6:
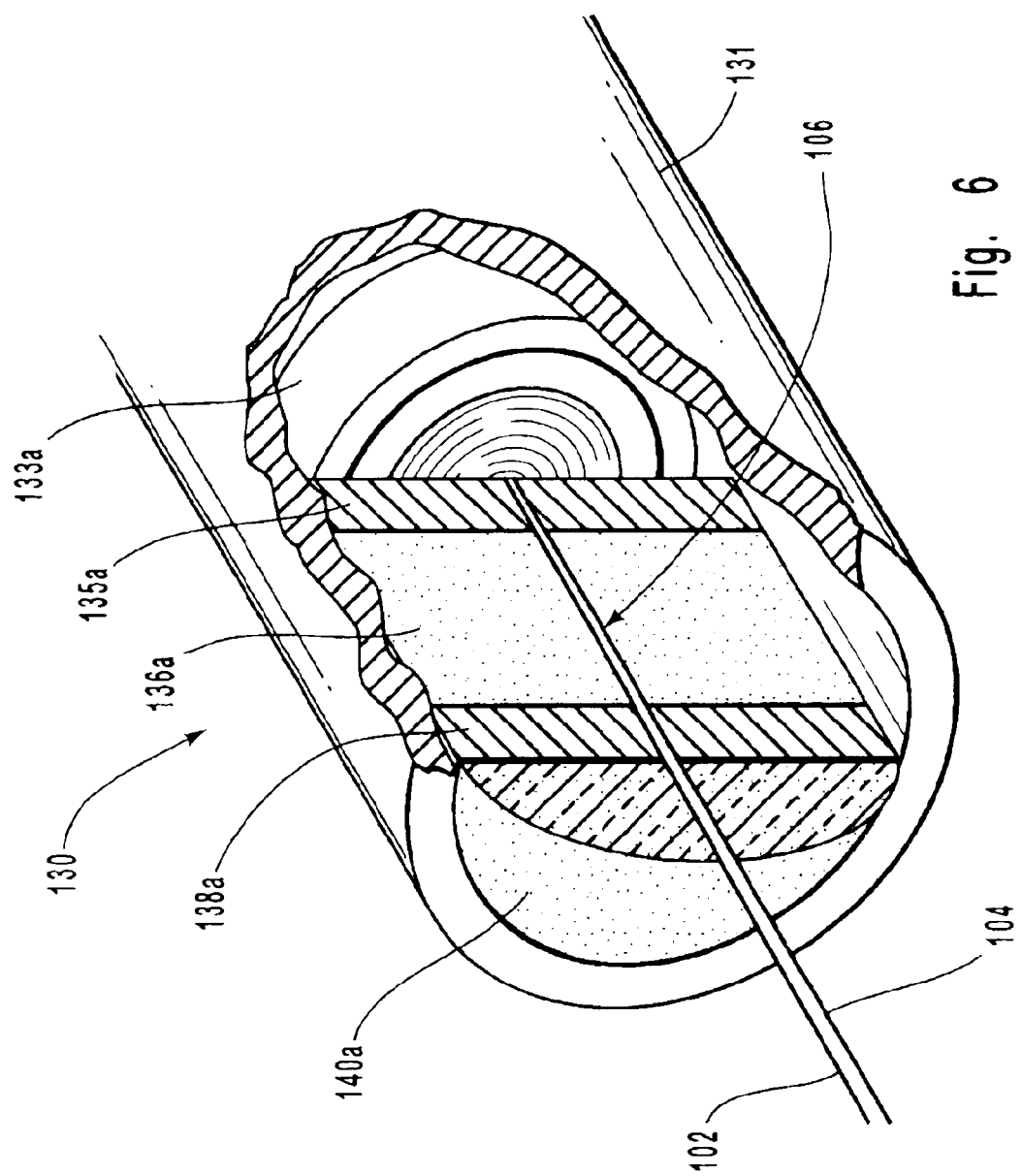
FIG. 6 is a cut away end view of an exemplary embodiment of the coupler package illustrating one of the first or second outer assembly seals.

FIG. 6 is a cutaway end view of an exemplary embodiment of the coupler package illustrating the first outer assembly seal 134a. As is illustrated in the drawing, the first outer assembly seal 134a contacts the end of both inner assembly 110 and anti-vibration ring 133a. Fibers 102, 104 pass through first outer assembly seal 134 such that the fibers 102, 104 are sealed internally in the first outer assembly seal 134. First washer 135a and second washer 138a in the preferred embodiment are formed from rubber. Epoxy element 136a and 140a are formed from epoxy. By utilizing washers formed from rubber and epoxy elements, flexibility, strength, and adhesion are provided to first outer assembly seal 134. As will be appreciated by those skilled in the art, first outer assembly seal 134 can be formed from any of a variety of materials arranged in a variety of configurations without departing from the scope or spirit of the present invention. For example, first outer assembly seal 134 can be formed entirely of molded plastic. Alternatively, washers made of fiberglass could be utilized with interspersed elements formed from resin.

Figure 7:
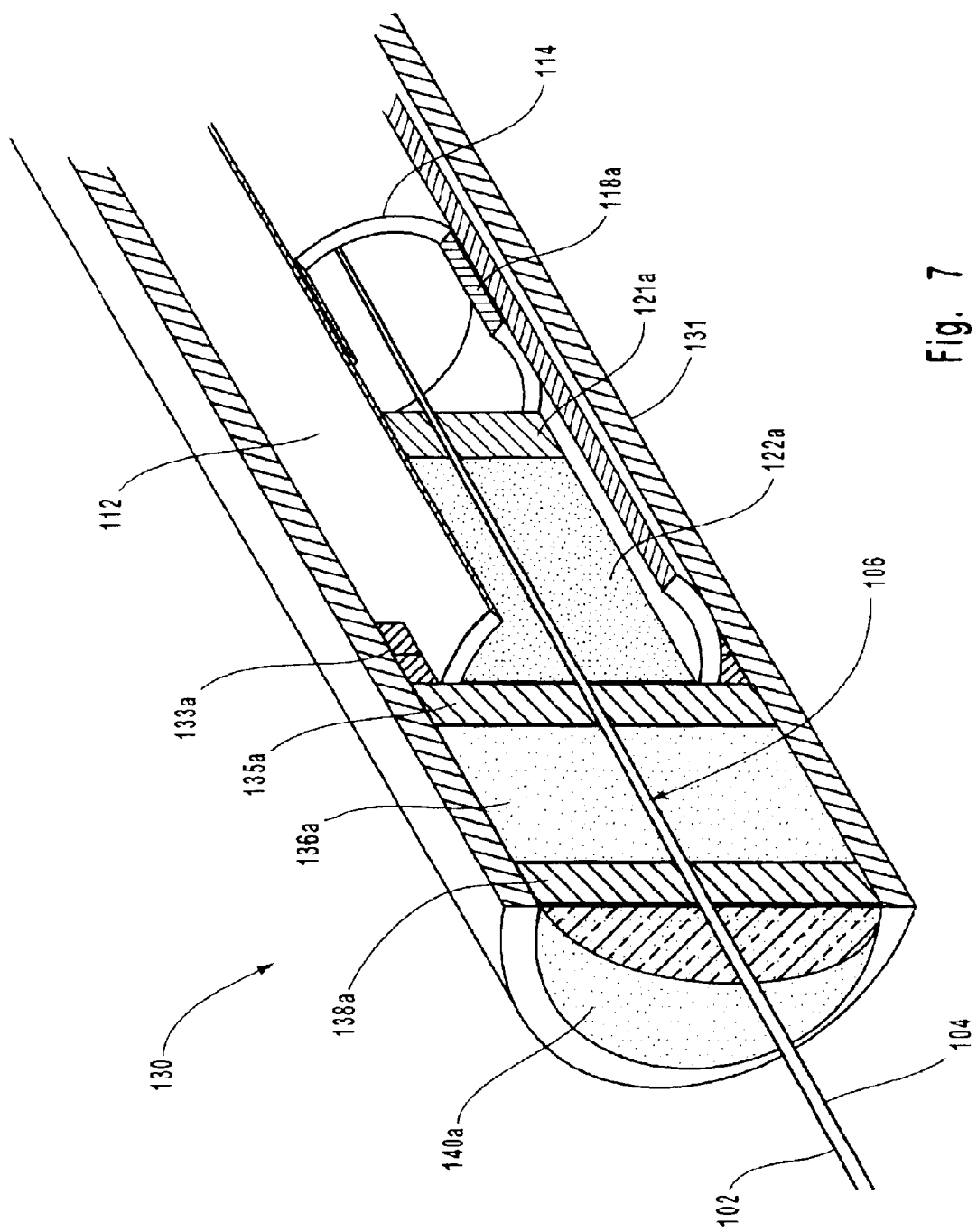
FIG. 7 is a cut away view of an exemplary embodiment of the coupler package illustrating the juxtaposition of the elements of the coupler package.

FIG. 7 is a cutaway view of an exemplary embodiment of the coupler package 100 illustrating the juxtaposition of the elements of the coupler package 100. Inner sleeve 114 is the inner most layer of the coupler package 100 providing a buffer against the elements for the fused portion of fibers 106. Distal to inner sleeve 114 lies first anti-vibration mechanism 118a. Distal to the anti-vibration mechanism 118a lies the washer 121a. Coupled to the anti-vibration mechanism 118a, and positioned distally thereto lies the epoxy element 122a. External to, and surrounding, the inner sleeve 114, the first anti-vibration mechanism 118a, the washer 122a, and the epoxy element 122a is the outer cylinder 112.

The outer cylinder 112 is ringed on its end by the first anti-vibration mechanism 133a of the outer packet. Distal to the anti-vibration mechanism lies the first washer 135a. Distal to the first washer 135a lies the epoxy element 136a. Distal to the epoxy element lies the second washer 138a. Distal to the second washer lies the epoxy end member 140a. Exterior to, and surrounding the outer cylinder 112, the anti-vibration mechanism 133a, the first washer 135a, the epoxy element 136a, the second washer 138a, and the epoxy end member 140a is the outer wall 131. The outer wall 131 is directly in contact with, and coupled to, each of the anti-vibration mechanism 132a, the first washer 135a, the epoxy element 136a, the second washer 138a, and the epoxy end member 140a is the outer wall 131. However, the outer wall 131 is only exterior to the outer cylinder 112 and does not directly contact the outer cylinder.

By providing multiple layers, chambers, and seals, the coupler package 100 of the present invention provides a greater protection against the elements including moisture, corrosion, vibration, and impact, thus providing additional protection to the fused fiber couplings. The double tube structure increasing the penetration length for water with the seals decreasing the cross section for water penetration. This is helpful where the severity of the elements is such that a traditional coupler package is insufficient to protect the fused fiber couplings. Additionally, such a coupler package is beneficial for use with wavelength division multiplexing couplers where wavelength shifts can be problematic. Indeed, the couplers of the invention can be constructed so as to comply with the conventional standards for WDM couplers, including the 85 degree Celsius, 85% relative humidity Telecordia reliability test.

The present invention may be embodied in other specific forms without departing from its spirit or essential characteristics. The described embodiments are to be considered in all respects only as illustrative and not restrictive. The scope of the invention is, therefor, indicated by the appended claims rather than by the foregoing description. All changes which come within the meaning and range of equivalency of the claims are to be embrace within their scope.

What is claimed and desired to be secured by United States Letters Patent is:

1. A coupler package for enclosing fused optical fibers, the coupler package comprising:
   an inner assembly that includes an outer aperture and an inner aperture, the inner aperture forming an inner chamber that includes anti-vibrational protection and enclosing the fused optical fibers so as to prevent moisture from interacting with the fused optical fibers, wherein the inner chamber is thermally insulated; and
   an outer assembly forming an outer chamber, the outer chamber enclosing the inner chamber, wherein the outer chamber is thermally insulated from the exterior of the coupler package.

2. The coupler package of claim 1, wherein the outer aperture of the inner assembly comprises a cylinder and the inner aperture comprises a sleeve.

3. The coupler package of claim 1, wherein the outer assembly comprises a cylinder.

4. The coupler package of claim 1, wherein the inner chamber is sealed and evacuated so as to remove moisture from the inner sealed chamber.

5. The coupler package of claim 4, wherein the inner sealed chamber is moisture impervious.

6. The coupler package of claim 1, further comprising an additional anti-vibration mechanism for providing protection against vibration.

7. The coupler package of claim 1, further comprising a plurality of anti-vibration rings for providing protection against vibration.

8. The coupler package of claim 1, wherein the inner aperture of the inner assembly comprises a tube having first and second ends and a seal for sealing the first and second ends of the tube.

9. The coupler package of claim 8, wherein the outer aperture of the inner assembly comprises a tube having first and second ends and a plurality of seals for sealing the first and second ends of the tube and wherein the outer assembly comprises a tube having first and second ends and a plurality of seals for sealing the first and second ends of the tube.

10. A coupler package for use with optical fibers having an unfused portion of fibers and a fused portion of fibers, the optical fibers passing beyond the periphery of the coupler package the coupler package comprising:
    an inner wall forming a lengthwise bore comprising inner and outer apertures being sealed at each end by inner and outer seals, respectively, the inner aperture comprising anti-vibrational rings coupled to the ends of the inner seal, wherein the inner wall encloses the fused portion of the optical fibers, the unfused portion of the optical fibers passing through the inner and outer seals, the seals forming a barrier against moisture; and
    an outer wall enclosing the inner wall, the outer wall having first and second sealed ends, the unsealed portion of the optical fibers passing through the first and second sealed ends.

11. The coupler package of claim 10, wherein the outer aperture of the inner wall comprises an outer cylinder and the inner aperture comprises an inner sleeve, and wherein the anti-vibrational rings are also coupled to the ends of the of the inner sleeve.

12. The coupler package of claim 11, wherein the outer cylinder has a low rate of thermal expansion.

13. The coupler package of claim 12, wherein the outer cylinder is comprised of the metal alloy INVAR.

14. The coupler package of claim 12, wherein the outer cylinder is comprised of stainless steel.

15. The coupler package of claim 11, wherein the inner sleeve provides buffering protection to the fused portion of fibers.

16. The coupler package of claim 15, wherein the inner sleeve is comprised of quartz.

17. The coupler package of claim 11, wherein the outer cylinder and the inner sleeve are not coterminous.

18. The coupler package of claim 17, wherein the inner sleeve is shorter than the outer cylinder, and wherein the anti-vibration rings of the inner aperture are coupled interior to the outer cylinder.

19. The coupler package of claim 10, wherein the outer wall has a low rate of thermal expansion.

20. A coupler package for enclosing optical fibers being fused together, the coupler package comprising:

an inner cylinder having a sealed opening at each end, the optical fibers passing through the inner cylinder and extending beyond the ends of the cylinder, wherein the inner cylinder encloses a portion of the optical fibers being fused together;

an outer cylinder enclosing the inner cylinder having a sealed opening at each end wherein the optical fibers extend beyond the ends of the outer cylinder; and one or more anti-vibrational rings coupled between the outer cylinder and the inner cylinder.

21. The coupler package of claim 20, wherein the inner cylinder provides impact protection for the optical fibers being fused together.

22. The coupler package of claim 20, wherein the air and moisture is evacuated from the inner cylinder to limit the corrosion of the fused optical fibers.

23. The coupler package of claim 20, wherein the inner cylinder provides moisture protection for the optical fibers being fused together.

24. The coupler package of claim 20, wherein the inner cylinder provides thermal protection for the optical fibers being fused together.

25. The coupler package of claim 20, wherein the inner cylinder provides vibration protection for the optical fibers being fused together.

26. The coupler package of claim 20, wherein the outer cylinder provides an additional layer of one or more of the following types of protection to the inner cylinder: impact protection, corrosion protection, moisture protection, thermal protection, and/or vibration protection.

27. The coupler package of claim 20, further comprising a plurality of sealing mechanisms for sealing the openings at each end of the inner cylinder and sealing the openings at each end of the outer cylinder.

28. The coupler package of claim 27, wherein the plurality of seals provide impact protection, corrosion protection, moisture protection, thermal protection, and/or vibration protection.

29. The coupler package of claim 20, wherein the one or more anti-vibrational rings are rubber.

30. The coupler package of claim 20, wherein the one or more anti-vibration rings prevent the inner cylinder from moving while also providing protection from vibration.

* * * * *